April 30, 1963 T. N. BUSCH 3,087,247
DETERMINING REFERENCE PLANE FOR SURFACE PLATE INSPECTION
Original Filed Sept. 15, 1960 2 Sheets-Sheet 1

Theodore N. Busch

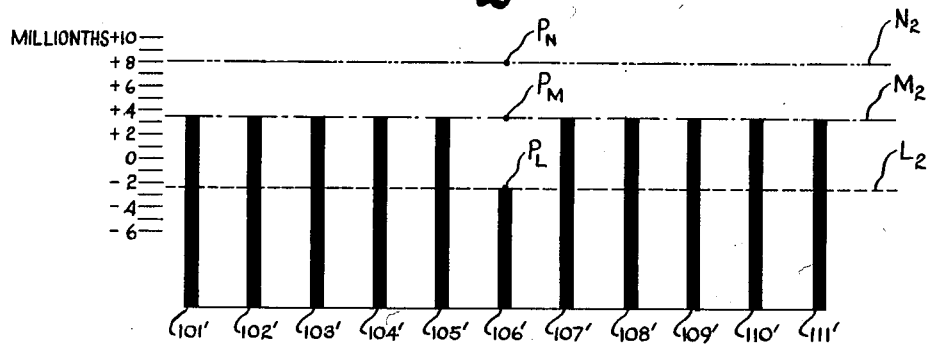
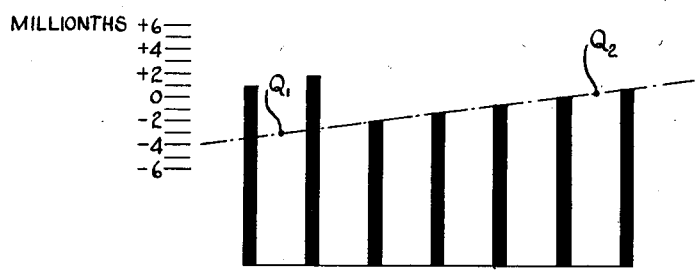
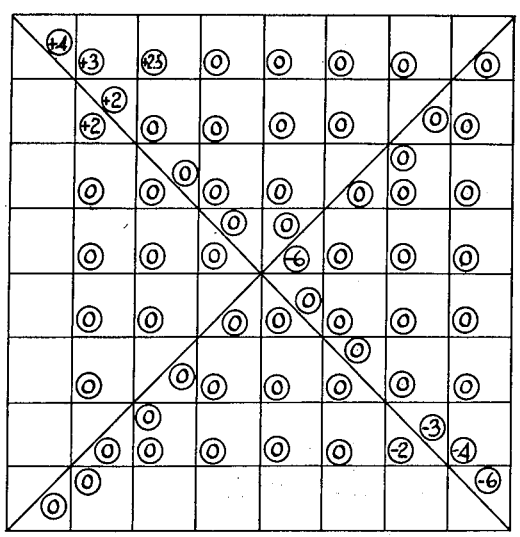

United States Patent Office 3,087,247
Patented Apr. 30, 1963

3,087,247
DETERMINING REFERENCE PLANE FOR
SURFACE PLATE INSPECTION
Theodore N. Busch, Chicago, Ill., assignor to The DoAll Company, Des Plaines, Ill., a corporation of Illinois
Original application Sept. 15, 1960, Ser. No. 56,316. Divided and this application Oct. 23, 1962, Ser. No. 232,398
3 Claims. (Cl. 33—1)

This invention relates to a method for inspecting the gaging surface of a surface plate by means of a calibrated straightedge, to obtain a quantitative appraisal of the deviation of said surface from true flatness at selected points thereon; and the invention refers more particularly to a method for readily selecting and using a reference plane to which elevation values for all measured points on the surface can be related.

This application is a division of my copending application Serial No. 56,316, filed September 15, 1960.

In many types of precision gaging work it is necessary to employ a surface plate having a reference surface which is flat to within a very few millionths of an inch. Since it is known that wear and aging can affect the flatness of the gaging surface of a surface plate, such a plate should be inspected from time to time to check the amount of its departure from true flatness at various points on its surface. With a record of the amount and direction of such deviations, corrections can be applied to readings made from the surface plate in order to insure a high degree of gaging accuracy. Obviously, such periodic checking also reveals whether the surface plate is within tolerance limits or is so far out of tolerance as to need refinishing.

Inspection of the gaging surface of a surface plate can be accomplished by mounting a calibrated straightedge on footblocks which rest upon the surface being inspected, and taking measurements, at predetermined intervals along the straightedge, of the distance between the reference surface and the straightedge. In order to insure a systematic spot check of the entire surface, or so much thereof as is to be inspected, measurements are taken along each of the opposite diagonals of the surface plate (which is usually square or rectangular), and then along each of a series of grid lines which extend parallel to the side edges of the surface plate.

Because the straightedge is always in effect supported by the surface to be checked, the distances between the surface and the straightedge, taken along any one line of measurements, cannot be directly compared with those taken along another line of measurements. Instead, all of the measurements must be related to an imaginary reference plane which lies on or near the surface of the plate, and it is the distances from this reference plane to the plate surface which have significance, since such distances are directly comparable with one another as values of the relative elevations of the several points on the surface to which measurements have been made. The reference plane used in surface plate inspection thus performs the same function, in relating the elevations of points on the surface plate to one another, as is performed by the concept of mean sea level in the measurement of land elevations.

Heretofore the equipment used in checking a surface plate has included a footblock which was adjustable as to height, and which cooperated with a fixed footblock in supporting a calibrated straightedge above the surface of the plate to be inspected. Height adjustability for at least one of the footblocks was necessary to facilitate the heretofore conventional practice of "balancing" the ends of the straightedge each time it was set up along one of the diagonals, that is, bringing the end portions of the straightedge to equal distances above the plate surface. To do this, a dial gage or electrical comparator was used to take measurements of the distance from the straightedge to the plate surface at points adjacent to each footblock and adjustments were made to the adjustable footblock until these two distances were equal.

It might be mentioned at this point that accuracy of the footblock adjustment depended upon the dexterity of the operator and the skill and accuracy with which readings were taken and interpreted. Moreover, an adjustable footblock could not be absolutely depended upon to hold its adjustment all during the period of time required for taking readings along a line of measurements across the surface of a plate. Consequently the use of an adjustable footblock was attended by many inaccuracies, which all too often went undetected. It is also to be noted that the surface elevations of the points on which the footblocks rested were not necessarily the same as the elevations of the nearby points to which the measurements were made.

After the straightedge had been set up along one of the diagonals across the plate surface, and its ends had been "balanced" by adjustment of the adjustable footblock, the gage or comparator was moved to the midpoint on the straightedge and set to zero. Thereafter, the gage or comparator was used to take readings, at designated stations along the straightedge, of the distance between the surface and the straightedge. The deviation of the straightedge from straightness at each of the stations was known from its calibration, and the readings obtained at the several stations were corrected for the calibrated deviation values and were tabulated.

This entire measurement process, including "balancing" of the ends of the straightedge and zeroing of the gage or comparator, was then repeated on the second diagonal. Because the gage had been zeroed at the midpoints of the two lines of measurements—i.e. at the intersection of the two diagonals—the corrected measurements taken along the two diagonals defined a pair of lines which intersected one another on the surface of the plate. These intersecting lines, of course, defined a plane, and the plane thus defined was taken as the reference plane to which all elevations on the surface of the plate were related.

When the reference plane had been established in this manner, lines of measurements were taken along grid lines that paralleled a side edge of the plate. With the straightedge set up on a grid line, the adjustable footblock and the gage were adjusted until the readings at the intersections of the diagonals with that grid line, compensated for the known deviations of the straightedge, corresponded to the corrected readings found for the same points when measuring along the diagonals. The straightedge was then assumed to be on the reference plane, or, more correctly, on a plane exactly parallel to the reference plane. Direct measurements were then taken from the straightedge to the plate surface, and such readings, compensated for the calibrated straightedge deviation, were then tabulated.

The process of setting up the straightedge and adjusting the adjustable footblock to dispose the straightedge on (or parallel to) the reference plane, taking measurements between the straightedge and the surface, and tabulating the measured values, was repeated for each grid line along which measurements were to be taken, until so much of the plate had been checked as was believed to provide a satisfactory indication of its surface contours.

It is to be observed that the reference plane obtained by this prior art procedure was at equal distances from the surface at the opposite ends of each diagonal (due to the "balancing" of the ends of the straightedge prior to taking measurements along each diagonal), and that it invariably touched the surface of the plate at the center of the same. It was assumed that a reference plane arrived at in this manner would provide a satisfactory picture of the surface contours of the plate; but in fact measurements taken to a reference plane thus determined could prove to be very confusing, and in some instances indicated that a surface plate was out of tolerance when in fact its departures from true flatness were not excessive.

By way of illustration, consider a plate surface having a high spot at one corner, but which is otherwise perfectly flat. A line of measurements taken from a "balanced" straightedge along a diagonal through the high corner would show varying values all along the length of the diagonal, and the tabulated values of these measurements could be interpreted to mean that the plate was high at both corners through which the diagonal extended, or that it was low at its center. Measurements to such a plate from a reference plane selected by the procedure heretofore conventional would have to be studied very carefully before they provided a clue to the fact that most of the plate was actually flat. On the other hand, if a reference plane had been selected which lay on or parallel to the major portion of the surface area, the tabulated values of the elevations relative to this plane would have revealed at once the true nature of the local inaccuracy in the plate surface.

The present invention is in part based upon a recognition that a reference plane is always, in fact, selected arbitrarily from among an infinite number of possible imaginary planes to which measurements may be related; and with this in mind it is an important object of this invention to provide a method for facilitating the selection, from among these possibilities, of a reference plane which offers the best promise of portraying the surface contours of a surface plate in a useful and revealing manner, to best disclose the true nature of the plate's deviations from flatness. The reference plane for a particular plate which best meets these reyuirements is hereinafter sometimes referred to as the practical gaging reference plane for that plate.

It is thus a general object of this invention to provide a method of determining a reference plane for surface plate checking, whereby the operator is enabled to exercise a wide scope of judgment and choice in the selection of the reference plane, so that he can readily select a reference plane which will best reveal the surface features that he desires to emphasize, and which may, if desired, be the practical gaging reference plane.

A more specific object of this invention resides in the provision of a novel method for determining a reference plane for use in surface plate inspection, which method lends itself to practice by means of an analogue computer that not only facilitates the selection of a reference plane which best suits the purpose for which the inspection is made, but also facilitates and expedites the tabulation of values of surface elevations of the plate relative to that reference plane. An analogue computer useful for these purposes is disclosed and claimed in my aforesaid copending application Serial No. 56,316.

A further object of this invention resides in the provision of a method for establishing a reference plane for use in the checking of a surface plate surface by means of a straightedge, which method obviates the necessity for using an adjustable footblock and thus eliminates the inaccuracies attendant upon the use of such a footblock, and instead permits readings to be taken from a straightedge mounted upon a pair of fixed footblocks that rest on the surface being checked.

It will be apparent from this that it is another object of this invention to eliminate in the checking of a surface plate by means of a straightedge, the tedious and time consuming operation of "balancing" the distances between the surface plate and the two ends of the straightedge, thus considerably simplifying and expediting the process of taking measurements.

It is thus another object of this invention to provide a simple and expeditious method of determining a reference plane for use in checking a surface plate by means of a straightedge, and of relating measured elevations to said reference plane, which method minimizes the chances for mechanical, observational and arithmetical errors and thereby greatly improves the accuracy of the checking procedure.

With the above and other objects in view, which will appear as the description proceeds, this invention resides in the novel method substantially as hereinafter described and more particularly defined by the appended claims, it being understood that such changes in the precise embodiment of the hereindisclosed invention may be made as come within the scope of the claims.

The accompanying drawings illustrate one complete example of the practice of the invention according to the best mode so far devised for the practical application of the principles thereof and in which:

FIGURE 3 is a graph representing another step in the method of this invention as applied to the checking of the plate shown in FIGURE 1;

Figure 1:
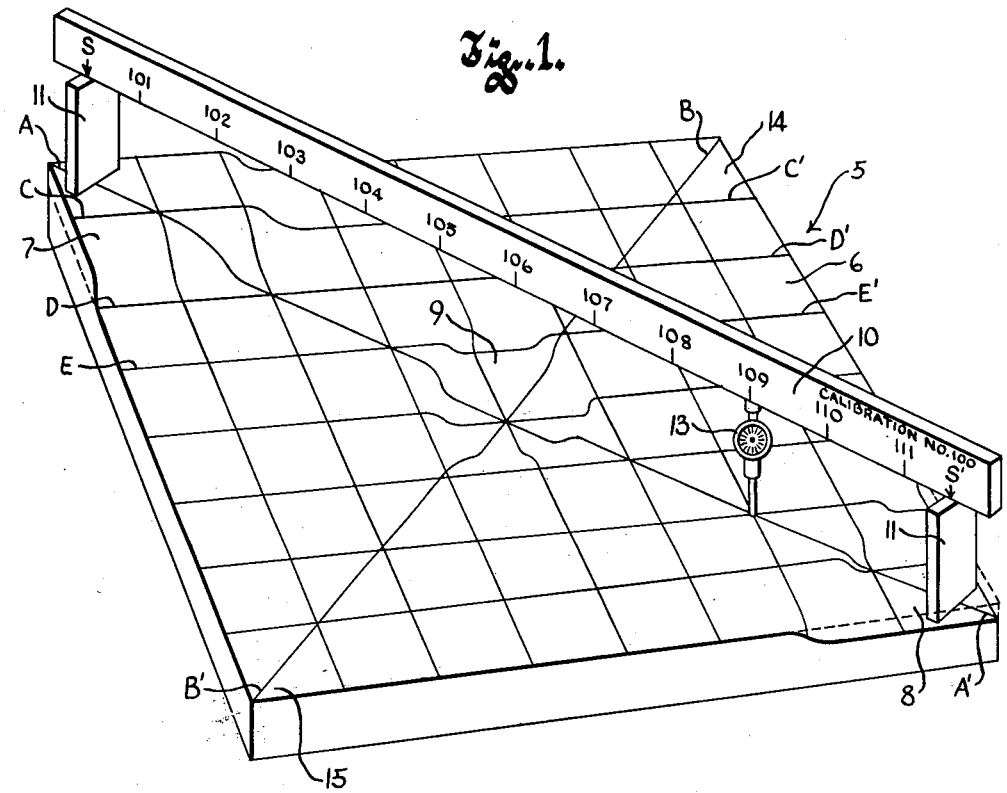
FIGURE 1 is a more or less diagrammatic perspective view of a surface plate upon which a straightedge has been set up for the purpose of taking measurements along one of the diagonals of the plate, the irregularities in the surface of the plate being shown greatly exaggerated for the sake of clarity.

FIGURE 4 is a graph representing the profile of the plate along a line of measurements parallel to an edge of the plate, and showing the relationship of one selected reference plane to the elevations on this profile; and FIGURE 5 is a plot of the several lines of measurements taken across the surface of the plate shown in FIGURE 1 in the course of checking the same, with elevation values for corresponding points on the plate surface tabulated thereon.

Referring now more particularly to the accompanying drawings, the numeral 5 designates generally a surface plate having a surface 6 which is intended to be accurately flat to within certain specified tolerances in order to be adapted for cooperation with various precision gaging instruments. For purposes of illustration it will be assumed that the surface 6 has certain deviations from true flatness, and specifically that it is high at its upper left hand (northwest) corner 7, low at its southeast corner 8, and has a depression at its center 9. All other portions of the surface are assumed to be flat within the limits to which measurements can be made. Although the discrepancies are illustrated in FIGURE 1 as being of very substantial magnitude, it will be appreciated that this is an exaggeration for the sake of clarity, since in actual practice the value of such deviations would most likely be on the order of a few millionths of an inch and would be undetectable without instruments.

For the purpose of checking the surface plate surface in accordance with the method of this invention, a calibrated straightedge 10 is mounted on a pair of fixed footblocks 11 which are so placed on the surface of the plate as to dispose the straightedge along one of the diagonals A—A' and B—B' across the plate, in this case along the diagonal A—A' extending from the northwest corner 7 to the southeast corner 8. Either diagonal may be used for making the first set of measurements. It will be understood that to facilitate making measurements, the plate surface is marked in the conventional manner with the diagonals and grid lines along which measurements are to be made.

Attention is directed to the fact that neither of the footblocks 11 is adjustable, and that the method of this invention therefore contemplates no height "balancing"

of the ends of the straightedge. However, as in the prior practice, it is necessary that the footblocks be accurately located under designated support points S and S' on the straightedge, in order to insure that the straightedge will be supported in the same way during use as it was during calibration, so that its calibrated deviations from straightness at each of the designated stations 101–111 along its length will be maintained while measurements are taken. It is also necessary that one of the designated stations, preferably the central station 106, be disposed over the other diagonal B—B'.

Preferably, measurements from the straightedge to the surface plate surface are made by means of an electrical comparator, although in this case, for simplicity, a dial gage 13 (illustrated more or less diagrammatically) is shown being used for this purpose. There is no need to zero the indicator of the gage 13, although it may be desirable to make a hasty check at a few points along the length of the straightedge to see that all measurements will fall within the scale of the dial. Thereafter a careful measurement is made, at each of the designated stations 101–111 along the length of the straightedge, of the distance from the straightedge to the surface 6. Since a single such measurement may be inaccurate, it is customary to make several readings at each station and take the mean or average of the several values thus obtained as the value for the station. The usual precautions are taken, of course, to insure that temperature and other conditions which affect gaging accuracy are kept stable.

Figure 2:
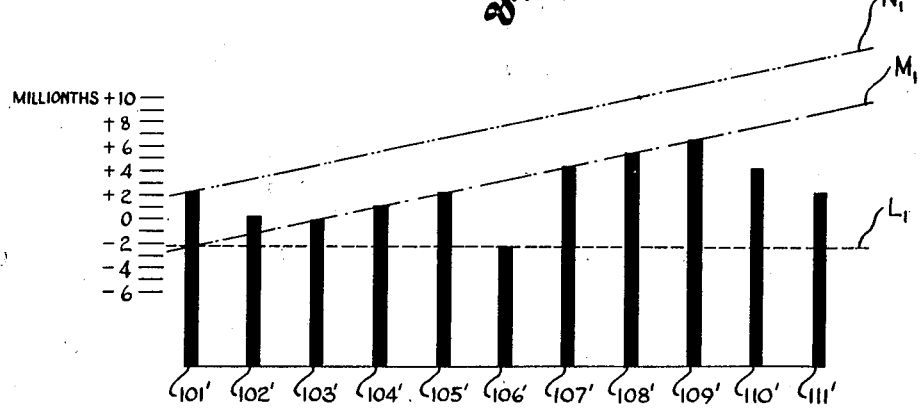
FIGURE 2 is a graph representing the practice of one step in the method of this invention as applied to the checking of the surface plate shown in FIGURE 1.

The "raw" distance measurement reading obtained for each station must be corrected by the value of the calibrated deviation of the straightedge at that station, and the corrected values for the several measurements are then plotted in the form of a graph, as illustrated in FIGURE 2. The horizontal and vertical scales of the graph may be arbitrarily selected, but the vertical scale should be of course very much magnified relative to the horizontal scale, so as to greatly exaggerate the relative elevations along the line of measurements and thus show them clearly. The graph may be in any usual form which satisfactorily reveals the surface profile, being shown in FIGURE 2 as a bar graph in which each bar corresponds to one of the calibrated stations along the length of the straightedge, and is designated by a primed numeral corresponding to the number of the station. The bars are spaced apart by distances proportional to the spacing between designated stations on the straightedge, and the tops of the bars are spaced from an arbitrarily selected zero line by distances corresponding to the corrected values for the distances from the straightedge to the surface 6. Thus the tops of the bars define a profile corresponding to that of the plate surface along the northwest-southeast diagonal A—A'.

On this graph representing the A—A' profile a straight line is now drawn which extends across all of the calibration stations and which lies in the selected reference plane. It is a feature of this invention that the determination of the location of this straight line is entirely a matter of choice with the operator, and he is thus free to select any of the infinite number of reference planes available to him.

Three of the possible choices are designated by the lines $L_1$, $M_1$, and $N_1$, in FIGURE 2. Line $M_1$ is so chosen as to lie along the major portion of the surface which is seen to be flat, and a reference plane defined by this line obviously affords the possibility of presenting a fair and revealing picture of the true nature of the discrepancies in the surface. Line $M_1$ therefore lies in the practical gaging reference plane. Line $L_1$ corresponds to the first reference plane defining line that would be established by following the prior art procedure. Note that $L_1$ crosses the outer stations 101' and 111' at points which are equal distances from the surface, and crosses the center station 106' exactly at the surface. It will be apparent that a tabulation of the distances from line $L_1$ to the surface at the several stations will present a confusing picture of the profile of this particular surface, suggesting that its deviations from flatness are numerous and quite irregular. Line $N_1$ is another of the many possible selections that could be made, having been drawn through the highest point on the surface (the northwest corner 7) and parallel to the flat area which occupies the major portion of the surface. Line $N_1$ would have value in emphasizing the deviations in the surface.

The values for the distance, at each station, from the selected straight line $L_1$, $M_1$ or $N_1$ to the surface are measured from the graph and tabulated. Preferably the tabulation is recorded on a sketch similar to FIGURE 5, on which the lines of measurement across the surface are indicated for reference purposes. The circled numerals in FIGURE 5 designate distances from the reference plane in millionths of an inch, positive (+) numbers denoting elevations above the reference plane and negative (=) numbers denoting elevations below it.

The next step in the method of this invention is to take measurements from the straightedge to the surface along the diagonal B—B' which extends from the northeast corner 14 of the plate to the southwest corner 15. The procedure followed in taking and correcting the measurements along the second diagonal B—B' is identical with that for the first diagonal A—A'. Care should be taken, however, that the straightedge is so located along the length of diagonal B—B' that one of the designated stations on the straightedge (preferably the center station 106) coincides with the intersection with the first diagonal A—A'.

The corrected values of the distances thus measured along diagonal B—B' are plotted in the form of a graph, as in FIGURE 3, and on this graph there must now be indicated the point which represents the first selected reference-plane-defining line. It is the plotting of this point which makes possible the free choice of a reference plane, and hence this step is of vital importance in the method of this invention. On the first graph (FIGURE 2), at the center station 106', there is read the value of the distance from the reference-plane-defining line ($L_1$, $M_1$ or $N_1$) to the surface. On the graph of the profile along diagonal B—B' (FIGURE 3), at the center station, there is plotted the point ($P_L$, $P_M$ or $P_N$) at the corresponding distance from the surface. Since the center station 106' on the graph FIGURE 3 is common to the diagonals A—A' and B—B', and the point just plotted is on the first reference-plane-defining line at the intersection of the diagonals, any line drawn through said point will intersect the first reference-plane-defining line $L_1$, $M_1$ or $N_1$, and will cooperate therewith to define a reference plane.

In FIGURE 3 there has been drawn one of the many possible lines that could be drawn through each of the three points $P_L$, $P_M$ and $P_N$, respectively, these lines being designated $L_2$, $M_2$ and $N_2$. The line $L_2$, drawn through the point $P_L$ which corresponds to line $L_1$, represents the reference plane that would be derived by following the prior art procedure described above. Note that the center point $P_L$ of line $L_2$ lies on the surface of the plate, and its ends (stations 101' and 111') are at equal distances from the surface, due to the "balancing" of the ends of the straightedge. It is noteworthy that a tabulation of values read from the line $L_2$ to the profile surface will tend to conceal the fact that the central depression in the plate is a local condition and that the major portion of its surface area is flat.

Line $M_2$ in FIGURE 3 is one of the lines that could be drawn through the point $P_M$, to cooperate with line $M_1$ in defining a reference plane. Line $M_2$ was chosen because it lies along the surface of the profile along most of its length, and is thus best calculated to reveal the true nature of the plate surface. Lines $M_1$ and $M_2$ thus define the practical gaging reference plane for this particular plate surface.

Line $N_2$ is one of the lines that could be drawn through the point $P_N$ to cooperate with line $N_1$ in defining a reference plane. It was drawn parallel to the major portion of the profile surface because in that position it emphasizes the discrepancies in the plate without concealing their true nature. Obviously, if line $N_2$ (or lines $L_2$ or $M_2$ for that matter) had been tilted at an oblique angle to the flat surface portion, the resultant reference plane would have depicted the surface contours of the plate in great confusion.

Assuming that the practical gaging reference plane defined by the lines $M_1$ and $M_2$ has been selected for checking purposes, the values corresponding to the distance from the line $M_2$ to the profile surface at each station on the graph, FIGURE 3, are now entered on the plot of the surface plate, as in FIGURE 5.

Next, measurements are taken with the straightedge extending along each of a series of grid lines that are parallel to the side edges of the plate, and the corrected values obtained from such measurements are plotted in the form of a graph, such as FIGURE 4, which depicts the profile of the surface 6 as measured along the east-west grid line C—C'. As with the procedure heretofore conventional, it is known that the reference-plane-defining lines $M_1$ and $M_2$ will appear on this profile graph as two points $Q_1$ and $Q_2$ which may be regarded as bench marks. The abscissas of points $Q_1$ and $Q_2$ are defined by the stations nearest the intersections of grid line C—C' with the respective diagonals A—A' and B—B'. The ordinates of points $Q_1$ and $Q_2$ are determined from the graphs, FIGURES 2 and 3, respectively, taking the distance from the surface to the reference plane at the stations nearest the intersections of diagonals A—A' and B—B' with the grid line C—C', interpolating if necessary. Having plotted the points $Q_1$ and $Q_2$, a straight line is drawn through them, corresponding to the reference plane, and the elevation of the surface at each station along grid line C—C', relative to the reference plane can then be taken off of the graph and tabulated on a plot of the surface, as in FIGURE 5.

A similar procedure is followed with respect to measurements taken along other grid lines, such as D—D', E—E', etc., until the inspection of the surface is completed.

On the calibrated straightedge shown in FIGURE 1 the support points S and S' are spaced apart by a distance greater than the width of the surface plate, and it will be understood that either a different straightedge is used for taking measurements along the grid lines or that the same straightedge is used with more closely spaced support points designated thereon, on its opposite side, for example. A separate calibration is of course made for the alternate pair of support points.

It might also be mentioned that the grid lines are preferably spaced apart at such intervals that they fall at the points of measurements along each diagonal, so as to avoid the necessity for interpolating values for stations between those at which measurements have been taken when determining the bench mark points.

The method of this invention lends itself to practice with the aid of an analogue computer, such as that disclosed and claimed in my aforesaid application Serial No. 56,316, which greatly facilitates selection of a reference plane and the relation of all measurements to that reference plane.

From the foregoing description, taken together with the accompanying drawings, it will be apparent that this invention provides a method of selecting a reference plane for use in checking a surface plate by means of a straightedge, which method allows the operator a wide freedom of choice in such selection and facilitates the selection of a practical gaging reference plane which reveals the features of a particular surface with a minimum of confusion. Thus the method of this invention greatly facilitates and expedites the inspection of a surface plate by means of a calibrated straightedge and at the same time improves the accuracy of the inspection procedure by minimizing the chances for mechanical discrepancies in the measuring apparatus and for errors in measurement and computation.

What is claimed as my invention is:

1. The method of determining a reference plane to be used in checking the flatness of the surface of a surface plate by means of a straightedge, which method comprises the steps of:

A. mounting the straightedge above the surface and extending along a measurement line across the surface;

B. taking measurements, at spaced apart stations along said measurement line, of the distance between said surface and the straightedge;

C. representing in graph form the elevations of the surface at said stations in relation to one another so that a first straight reference line can be selected which extends along the graphic representation and which lies in a desired reference plane;

D. depicting the reference line thus selected in relation to the graphic representation so that the true values of the distances from said reference line to the surface of the surface plate at each of said stations can be determined;

E. mounting the straightedge above the surface in another location so that it extends along a second measurement line across the surface which intersects the first measurement line;

F. taking measurements, at spaced apart stations along said second measurement line including its point of intersection with the first measurement line, of the distance between the surface and the straightedge;

G. representing in graph form the elevations of the surface at said stations along the second measurement line in relation to one another;

H. indicating on the graphic representation of the relative elevations along the second measurement line a point corresponding to the distance from the surface to the first reference line at the point of intersection of the first and second measurement lines; and I. depicting a line through said point, extending along said second designated graphic representation, which cooperates with the first depicted line to define a reference plane.

2. The method of checking the variation from true flatness of the gaging surface of a surface plate by means of a calibrated straightedge, which method is characterized by the steps of:

A. mounting the straightedge on a pair of footblocks of equal height resting on said surface of the surface plate at spaced apart locations along a first line of measurements;

B. taking measurements of the distances between the straightedge and said surface at defined stations along said first line of measurements;

C. mounting the straightedge on a pair of footblocks of equal height resting on said surface at spaced apart locations along a second line of measurements which intersects the first line of measurements at one of said stations;

D. taking measurements of the distances between the straightedge and said surface at defined stations along the second line of measurements, including the station common to both lines of measurements;

E. graphically representing the measurements taken along each line of measurements, corrected for calibrated deviations of the straightedge, with the representations of such measurements spaced apart at intervals corresponding to the spacings between stations, to thus provide a portrayal of the profile of said surface along each line of measurements;

F. delineating a straight line in such relation to one of the portrayals as to lie in a selected family of reference planes;
G. locating the point relative to the other portrayal that corresponds to the distance between said delineated straight line and said surface at said common station; and
H. delineating a straight line through said point that cooperates with the first delineated straight line in defining a reference plane to which measurements can be related that are taken along other lines of measurements which intersect both of said lines of measurements.

3. The method of checking the variation from true flatness of the gaging surface of a surface plate by means of a calibrated straightedge, which method is characterized by the steps of:
A. mounting the straightedge on a pair of footblocks of equal height resting on said surface of the surface plate at spaced apart locations along one of a pair of intersecting lines of measurements across said surface;
B. taking measurements of the distances between the straightedge and said surface at defined stations along said one line of measurements, including the station defined by the intersection of said two lines of measurements;
C. similarly
   (1) mounting the straightedge and
   (2) taking measurements at defined stations along the other line of measurements, including the station defined by the intersection of said lines of measurements;
D. separately graphically representing the measurements taken along each line of measurements, corrected for calibrated deviation of the straightedge, with the representations of the measurements along each line spaced apart at intervals corresponding to the spaces between said stations to thus provide portrayals of the profiles of said surface along said lines;
E. delineating a straight line in such relation to one of said portrayals as to correspond to the location of a line lying in a desired reference plane;
F. locating the point relative to the other of said portrayals that corresponds to the location of said straight line relative to the surface profile at said station; and
G. delineating a straight line through said located point that bears a predetermined relationship to the surface profile depicted by said other portrayal and which cooperates with the first delineated straight line in defining a reference plane to which measurements taken on other lines of measurements across said surface, each intersecting said two lines of measurements, can be related.

References Cited in the file of this patent
UNITED STATES PATENTS
2,947,083    Rahn _____ Aug. 2, 1960